UNITED STATES PATENT OFFICE.

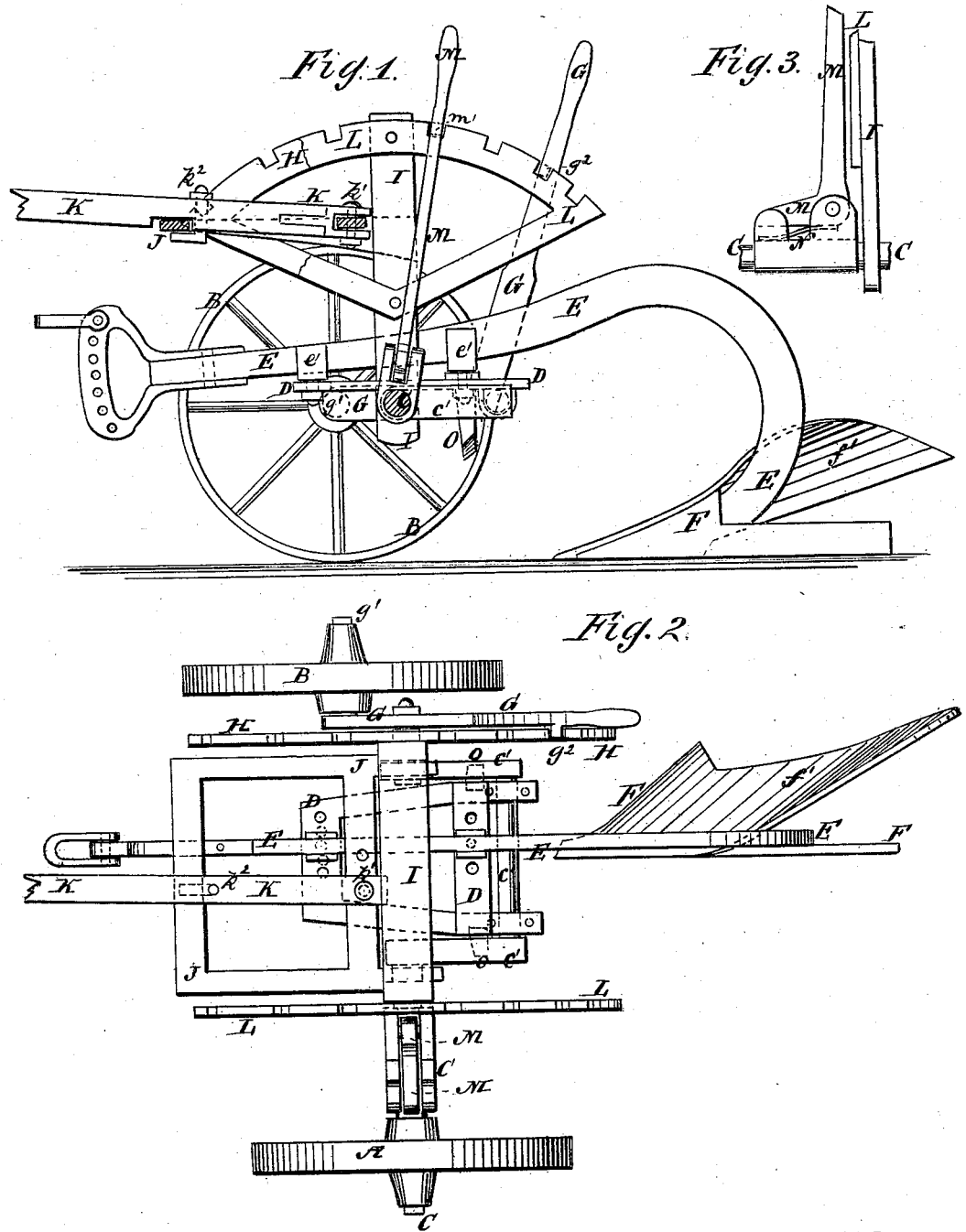

JAMES L. FLORANCE, OF PLANO, TEXAS.

IMPROVEMENT IN RIDING-PLOWS.

Specification forming part of Letters Patent No. 193,152, dated July 17, 1877; application filed April 2, 1877.

*To all whom it may concern:*

Be it known that I, JAMES L. FLORANCE, of Plano, in the county of Collin and State of Texas, have invented a new and useful Improvement in Riding-Plows, of which the following is a specification:

Figure 1 is a side view of my improved machine, the near wheel being cut off, and part being broken away to show the construction. Fig. 2 is a top view of the same. Fig. 3 is a detailed view of the lever for raising and lowering the plow.

Similar letters of reference indicate corresponding parts.

The object of this invention is to furnish an improved riding or sulky plow which shall be so constructed that the plow may be readily lowered into, raised from, and adjusted to run at any desired depth in the ground, and which may be adjusted to take or leave land, and to hold the carriage level when both wheels are running upon unplowed land, and when one wheel is running in a furrow.

The invention will first be described in connection with the drawing, and then pointed out in the claims.

A is the near wheel, and B is the off wheels, of the plow-carriage. The near wheel A revolves upon the journal of the axle C, upon the other part of which is formed a crank, $c'$.

To the crank $c'$ is pivoted the rear end of a frame, D, called by me a "governor," and in the cross-bars of which are formed a number of holes to receive bolts $e'$, attached to the plow-beam E, so that a large plow or a small plow, or two small plows, may be attached to said frame, and so that the plow may be adjusted to take or leave land. The rear end of the beam E is bent downward with a long curve, to bring the beam to such a height above the plow as to prevent it from being choked with rubbish.

To the end of the beam E is attached the plow F, the mold-board $f'$ of which is made long and narrow, and with its lower edge inclined upward, as shown in Fig. 1, to adapt it for use for plowing black lands.

To the outer or off end of the axle C is pivoted a lever, G, to the end of which is attached, or upon it is formed, a journal, $g^1$, upon which revolves the off wheel B, so that the said wheel B may be adjusted to hold the carriage level, whether the said wheel run in the furrow or upon the unplowed land. Upon the inner side of the lever G is formed a lug or projection, $g^2$, to enter notches in the convex edge of a curved bar, H, which is attached to an upright or U frame, I, the ends of which are pivoted to, and ride upon, the axle C at the ends of its crank $c'$.

To the upright frame I is rigidly attached the rear end of a horizontal frame, J. To the cross-bars of the frame J is secured the tongue K, the rear end of which is slotted, or has a slotted block attached to it, to receive the rear cross-bar of the frame J and the bolt $k^1$, by which it is secured to said cross-bar. Several holes are formed in the cross-bar of the frame J, so that the tongue K may be adjusted as required. The tongue K is secured to the forward cross-bar of the frame J by a hook-bolt, $k^2$. By this construction the tongue K can be adjusted to correspond with the plow or plows E F, or to cause said plow to take or leave land.

To the near side of the frame I is attached a curved and notched catch-bar, L, to receive a projection or lug, $m'$, formed upon the inner side of the long arm of the bent lever M, which is pivoted at its angle to the axle C at the side of the frame I. The short arm of the lever M extends out along the upper side of the axle C, works between guide-lugs attached to said axle, and is held up, holding its long arm pressed against the catch-bar L, by a spring, N, placed beneath it, and also attached to the axle C. By this construction, by operating the lever M, the axle C and the crank $c'$ will be turned to raise the plow E F from and lower it to the ground.

To the rear part of the side bars of the frame or governor D are attached the upper ends of two bars, O, the lower ends of which are bent outward, or have hooks formed upon them, to catch upon the crank $c'$ when the plow is raised out of the ground to pitch the plow forward, and prevent the forward end of the beam E from interfering with the tongue K or its brace-frame J.

Having thus described my invention, I claim as new and desire to secure by Letters Patent—

1. The combination, with the frame D, pivoted to the cranked axle C $c'$, and having apertured cross-bar, of the superposed beam E, having bolts $e'$, as and for the purpose described.

2. The combination of the hook-arms O with the hinged frame D, and with the crank $c'$ of the axle C, substantially as herein shown and described.

JAS. L. FLORANCE.

Witnesses:
J. W. HAGGARD,
J. M. GEE.